United States Patent
Ray et al.

(10) Patent No.: US 10,877,892 B2
(45) Date of Patent: Dec. 29, 2020

(54) PREDICTIVE PAGING TO ACCELERATE MEMORY ACCESS

(71) Applicant: Micron Technology, Inc., Boise, ID (US)

(72) Inventors: Anirban Ray, Santa Clara, CA (US);
Samir Mittal, Palo Alto, CA (US);
Gurpreet Anand, Pleasanton, CA (US);
Parag R. Maharana, Dublin, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/032,331

(22) Filed: Jul. 11, 2018

(65) Prior Publication Data

US 2020/0019506 A1    Jan. 16, 2020

(51) Int. Cl.
| | |
|---|---|
| *G06F 12/0862* | (2016.01) |
| *G06F 12/1009* | (2016.01) |
| *G06F 12/0871* | (2016.01) |
| *G06F 12/0873* | (2016.01) |
| *G06N 3/08* | (2006.01) |
| *G06F 9/455* | (2018.01) |

(52) U.S. Cl.
CPC ...... *G06F 12/0862* (2013.01); *G06F 9/45558* (2013.01); *G06F 12/0871* (2013.01); *G06F 12/0873* (2013.01); *G06F 12/1009* (2013.01); *G06N 3/08* (2013.01); *G06F 2009/45583* (2013.01); *G06F 2212/602* (2013.01); *G06F 2212/6024* (2013.01)

(58) Field of Classification Search
CPC .................................................. G06F 9/45558
See application file for complete search history.

(56) References Cited

U.S. PATENT DOCUMENTS

| | | | |
|---|---|---|---|
| 5,390,334 A | | 2/1995 | Harrison |
| 5,727,150 A | * | 3/1998 | Laudon .............. G06F 12/08 709/215 |
| 5,909,540 A | | 6/1999 | Carter et al. |
| 5,918,229 A | | 6/1999 | Davis et al. |
| 6,026,475 A | | 2/2000 | Woodman |

(Continued)

FOREIGN PATENT DOCUMENTS

KR    20160116533 A    10/2016

OTHER PUBLICATIONS

Title: Predictive Data Orchestration in Multi-tier Memory Systems, U.S. Appl. No. 16/054,819, filed Aug. 3, 2018, Iventor(s): Samir Mittal, et al.

(Continued)

*Primary Examiner* — William E. Baughman
(74) *Attorney, Agent, or Firm* — Greenberg Traurig

(57) ABSTRACT

A computing system having memory components, including first memory and second memory. The computing system further includes a processing device, operatively coupled with the memory components, to: receive, in a prediction engine, usage history of pages in the second memory; train a prediction model based on the usage history; predict, by the prediction engine using the prediction model, likelihood of the pages being used in a subsequent period of time; and responsive to the likelihood predicted by the prediction engine, copy by a controller data in a page in the second memory to the first memory.

20 Claims, 7 Drawing Sheets

(56) References Cited

U.S. PATENT DOCUMENTS

| | | |
|---|---|---|
| 6,230,260 B1 | 5/2001 | Luick |
| 6,247,097 B1 | 6/2001 | Sinharoy |
| 6,279,138 B1 | 8/2001 | Jadav et al. |
| 6,473,845 B1 | 10/2002 | Hornung et al. |
| 7,376,681 B1 | 5/2008 | Todd et al. |
| 8,082,400 B1 | 12/2011 | Chang et al. |
| 8,117,373 B2 | 2/2012 | Berlin |
| 8,131,814 B1 | 3/2012 | Schlansker et al. |
| 8,135,933 B2 | 3/2012 | Fisher et al. |
| 8,316,187 B2 | 11/2012 | Pothireddy |
| 8,352,709 B1 | 1/2013 | Glasco et al. |
| 8,560,761 B2 | 10/2013 | Tzeng |
| 8,700,724 B2 | 4/2014 | McDaniel et al. |
| 8,825,937 B2 | 9/2014 | Atkisson et al. |
| 8,838,887 B1 | 9/2014 | Burke et al. |
| 8,868,842 B2 | 10/2014 | Yano et al. |
| 8,930,647 B1 | 1/2015 | Smith |
| 8,965,819 B2 | 2/2015 | Tirunagari |
| 8,996,834 B2 | 3/2015 | Brenner et al. |
| 9,342,453 B2 | 5/2016 | Nale et al. |
| 9,619,408 B2 | 4/2017 | Nale et al. |
| 9,910,618 B1* | 3/2018 | Curley .................. G06F 11/108 |
| 10,120,797 B1 | 11/2018 | Foley et al. |
| 10,223,371 B2 | 3/2019 | Thirumal |
| 10,241,943 B2 | 3/2019 | Nale et al. |
| 10,282,322 B2 | 5/2019 | Nale et al. |
| 10,282,323 B2 | 5/2019 | Nale et al. |
| 10,289,566 B1 | 5/2019 | Dalmatov et al. |
| 10,430,723 B1 | 10/2019 | Tzur et al. |
| 2002/0196659 A1 | 12/2002 | Hurst et al. |
| 2003/0126232 A1 | 7/2003 | Mogul et al. |
| 2004/0186960 A1 | 9/2004 | Poggio |
| 2006/0087893 A1 | 4/2006 | Nishihara et al. |
| 2006/0095679 A1 | 5/2006 | Edirisooriya |
| 2006/0206658 A1 | 9/2006 | Hendel et al. |
| 2007/0033367 A1 | 2/2007 | Sakarda et al. |
| 2009/0113422 A1 | 4/2009 | Kani |
| 2009/0150639 A1* | 6/2009 | Ohata .................... G06F 3/0608 711/172 |
| 2010/0011169 A1 | 1/2010 | Pothireddy |
| 2010/0082899 A1* | 4/2010 | Nakajima ............. G06F 9/5077 711/114 |
| 2010/0281230 A1 | 11/2010 | Rabii et al. |
| 2010/0293412 A1* | 11/2010 | Sakaguchi .......... G06F 11/0727 714/17 |
| 2011/0161554 A1 | 6/2011 | Selinger et al. |
| 2011/0231857 A1 | 9/2011 | Zaroo et al. |
| 2011/0238887 A1 | 9/2011 | Bazzani |
| 2011/0238899 A1 | 9/2011 | Yano et al. |
| 2012/0047312 A1* | 2/2012 | Nathuji ................. G06F 9/3832 711/6 |
| 2012/0054419 A1 | 3/2012 | Chen et al. |
| 2012/0084497 A1 | 4/2012 | Subramaniam et al. |
| 2013/0111113 A1 | 5/2013 | Harari et al. |
| 2013/0145095 A1 | 6/2013 | McKean et al. |
| 2013/0151761 A1 | 6/2013 | Kim et al. |
| 2013/0152086 A1 | 6/2013 | Yoo et al. |
| 2013/0226837 A1 | 8/2013 | Lymberopoulos et al. |
| 2014/0006740 A1* | 1/2014 | Tokusho ................ G06F 12/02 711/165 |
| 2014/0032818 A1 | 1/2014 | Chang et al. |
| 2014/0040550 A1 | 2/2014 | Nale et al. |
| 2014/0089631 A1 | 3/2014 | King |
| 2015/0026509 A1 | 1/2015 | Zhang et al. |
| 2015/0032921 A1 | 1/2015 | Malkin |
| 2015/0067087 A1 | 3/2015 | Guerin et al. |
| 2015/0082062 A1 | 3/2015 | Saraswat et al. |
| 2015/0097851 A1 | 4/2015 | Anderson et al. |
| 2015/0106656 A1 | 4/2015 | Bian et al. |
| 2015/0160858 A1 | 6/2015 | Okada et al. |
| 2015/0169238 A1 | 6/2015 | Lee et al. |
| 2015/0199276 A1 | 7/2015 | Radhakrishnan et al. |
| 2015/0212741 A1 | 7/2015 | Lee et al. |
| 2015/0227465 A1 | 8/2015 | Sundaram et al. |
| 2015/0268875 A1 | 9/2015 | Jeddeloh |
| 2015/0278091 A1 | 10/2015 | Wilkerson et al. |
| 2015/0356125 A1 | 12/2015 | Golander et al. |
| 2016/0054922 A1 | 2/2016 | Awasthi et al. |
| 2016/0188218 A1 | 6/2016 | Gray et al. |
| 2016/0188700 A1 | 6/2016 | Kleinschnitz, Jr. et al. |
| 2016/0210167 A1 | 7/2016 | Bolic et al. |
| 2016/0210251 A1 | 7/2016 | Nale et al. |
| 2016/0210465 A1 | 7/2016 | Craske et al. |
| 2016/0212214 A1 | 7/2016 | Rahman et al. |
| 2016/0253263 A1 | 9/2016 | Takada |
| 2016/0306557 A1 | 10/2016 | Koseki et al. |
| 2016/0350236 A1 | 12/2016 | Tsirkin et al. |
| 2017/0039164 A1 | 2/2017 | Ioannou et al. |
| 2017/0060754 A1 | 3/2017 | Nakra et al. |
| 2017/0123796 A1 | 5/2017 | Kumar et al. |
| 2017/0131902 A1 | 5/2017 | Goss et al. |
| 2017/0177486 A1 | 6/2017 | Horn |
| 2017/0249266 A1 | 8/2017 | Nale et al. |
| 2017/0255383 A1 | 9/2017 | Chang et al. |
| 2017/0262215 A1 | 9/2017 | Banerjee et al. |
| 2017/0285992 A1 | 10/2017 | Vogt |
| 2017/0302734 A1 | 10/2017 | Liang et al. |
| 2017/0316321 A1 | 11/2017 | Whitney et al. |
| 2017/0364422 A1 | 12/2017 | Antony et al. |
| 2017/0364450 A1 | 12/2017 | Struttmann |
| 2018/0011790 A1 | 1/2018 | Gaur et al. |
| 2018/0024853 A1 | 1/2018 | Warfield et al. |
| 2018/0046581 A1 | 2/2018 | Banerjee et al. |
| 2018/0089087 A1* | 3/2018 | Chang .................. G06F 12/0862 |
| 2018/0121366 A1 | 5/2018 | Tian |
| 2018/0150219 A1 | 5/2018 | Chen et al. |
| 2018/0189207 A1 | 7/2018 | Nale et al. |
| 2018/0293163 A1 | 10/2018 | Bergeron |
| 2018/0316569 A1 | 11/2018 | Cilfone et al. |
| 2019/0004841 A1 | 1/2019 | Starks |
| 2019/0018809 A1 | 1/2019 | Nale et al. |
| 2019/0079689 A1* | 3/2019 | Cherubini ............. G06F 3/0634 |
| 2019/0129847 A1 | 5/2019 | Roh |
| 2019/0179760 A1 | 6/2019 | Bhargava et al. |
| 2019/0243552 A1 | 8/2019 | Maharana et al. |
| 2019/0243570 A1 | 8/2019 | Mittal et al. |
| 2019/0243756 A1 | 8/2019 | Ray et al. |
| 2019/0243771 A1 | 8/2019 | Mittal et al. |
| 2019/0243787 A1 | 8/2019 | Mittal et al. |
| 2019/0253520 A1 | 8/2019 | Maharana et al. |
| 2019/0332556 A1 | 10/2019 | Nale et al. |
| 2020/0073827 A1 | 3/2020 | Wallach |
| 2020/0074094 A1 | 3/2020 | Wallach |

OTHER PUBLICATIONS

Title: Memory Systems Having Controllers Embedded in Packages of Integrated Circuit Memory, U.S. Appl. No. 16/162,905, filed Oct. 17, 2018, Inventor(s): Samir Mittal, et al.

Title: Accelerate Data Access in Memory Systems Via Data Stream Segregation, U.S. Appl. No. 16/166,624, filed Oct. 22, 2018, Iventor(s): Samir Mittal, et al.

Title: Memory Virtualization for Accessing Heterogeneous Memory Components, U.S. Appl. No. 16/054,719, filed Aug. 3, 2018, Inventor(s): Anirban Ray, et al.

Remote Direct Memory Access in Multi-tier Memory Systems, U.S. Appl. No. 16/107,624, filed Aug. 21, 2018, Inventor(s): Parag Maharana, et al.

Title: Optimization of Data Access and Communication in Memory Systems, U.S. Appl. No. 16/183,234, filed Nov. 7, 2018, Inventor(s): Parag Maharana, et al.

A. Romanow, J. Mogul, T. Talpey, S. Bailey, "Remote Direct Memory Access (RDMA) over IP Problem Statement", RFC 4297, Dec. 2005 (https://www.rfc-editor.org/search/rfc_search_detail.php).

International Search Report and Written Opinion, PCT/US2019/013841, Apr. 23, 2019.

International Search Report and Written Opinion, PCT/US2019/013836, Apr. 22, 2019.

International Search Report and Written Opinion, PCT/US2019/015602, dated May 3, 2019.

(56) References Cited

OTHER PUBLICATIONS

International Search Report and Written Opinion, PCT/US2019/014205, dated May 1, 2019.
International Search Report and Written Opinion, PCT/US2019/014285, dated May 8, 2019.
"Solid-State Drive", Wikipedia, printed on Mar. 14, 2018.
"Write combining", Wikipedia encyclopedia entry located at https://en.wikipedia.org/wiki/Write_combining, Feb. 12, 2018.
Demand paging, Wikipedia, printed on Apr. 18, 2018.
Device driver, Wikipedia, printed on Apr. 19, 2018.
Garbage collection (computer science), Wikipedia, printed on Sep. 26, 2018.
Graphics processing unit, Wikipedia, printed on Jul. 26, 2018.
Hypervisor, Wikipedia, printed on Apr. 19, 2018.
InfiniBand, Wikipedia, printed on Jul. 26, 2018.
Integrated circuit, Wikipedia, printed on Sep. 24, 2018.
Interlaken (networking), Wikipedia, printed on Sep. 21, 2018.
Message Passing Interface, Wikipedia, printed on Jul. 26, 2018.
Microsequencer, Wikipedia, printed on Sep. 21, 2018.
Operating system, Wikipedia, printed on Apr. 18, 2018.
PCI Express, Wikipedia, printed on Sep. 21, 2018.
Page cache, Wikipedia, printed on Apr. 18, 2018.
Page replacement algorithm, Wikipedia, printed on Jul. 31, 2018.
Page table, Wikipedia, printed on Jul. 31, 2018.
Paging, Wikipedia, printed on Apr. 18, 2018.
RAM drive, Wikipedia, printed on Apr. 18, 2018.
SerDes, Wikipedia, printed on Sep. 21, 2018.
Switched fabric, Wikipedia, printed on Jul. 26, 2018.
Translation lookaside buffer, Wikipedia, printed on Apr. 18, 2018.
Virtual memory, Wikipedia, printed on Apr. 18, 2018.
mmap, Wikipedia, printed on Apr. 18, 2018.
International Search Report, PCT/US2019/040413, dated Oct. 25, 2019.
Jeff Hawkins et al., "Sequence memory for prediction, inference and behaviour", In: Philosophical Transactions of the Royal Society B: Biological Sciences, pp. 1203-1209, May 1, 2009.
International Search Report and Written Opinion, PCT/US2019/014275, dated May 8, 2019.
Cai, "Error Characterization, Mitigation and Recovery", 2017.
Oracle, "NFS Over ROMA", Retrieved on Feb. 18, 2020 from https://web.archive.org/web/20150920225910/https://docs.oracle.com/cd/E23824_01/html/821-1454/rfsrefer-154.html# (Year: 2015).
Vatto, "Analyzing Intel-Micron 3D XPoint: The NextGeneration Non-Volatile Memory", 2015.
International Search Report and Written Opinion, PCT/US2020/021825, dated Jul. 6, 2020.

\* cited by examiner

US 10,877,892 B2

PREDICTIVE PAGING TO ACCELERATE MEMORY ACCESS

FIELD OF THE TECHNOLOGY

At least some embodiments disclosed herein relate to memory systems in general, and more particularly, but not limited to predictive paging to accelerate memory access in computing systems.

BACKGROUND

A memory sub-system can be a memory module, such as a dual in-line memory module (DIMM), a small outline DIMM (SO-DIMM), or a non-volatile dual in-line memory module (NVDIMM). A memory sub-system can be a storage system, such as a solid-state drive (SSD), or a hard disk drive (HDD). A memory sub-system can include one or more memory components that store data. The memory components can be, for example, non-volatile memory components and volatile memory components. Examples of memory components include memory integrated circuits. Some memory integrated circuits are volatile and require power to maintain stored data. Some memory integrated circuits are non-volatile and can retain stored data even when not powered. Examples of non-volatile memory include flash memory, Read-Only Memory (ROM), Programmable Read-Only Memory (PROM), Erasable Programmable Read-Only Memory (EPROM) and Electronically Erasable Programmable Read-Only Memory (EEPROM) memory, etc. Examples of volatile memory include Dynamic Random-Access Memory (DRAM) and Static Random-Access Memory (SRAM). In general, a host system can utilize a memory sub-system to store data at the memory components and to retrieve data from the memory components.

For example, a computer can include a host system and one or more memory sub-systems attached to the host system. The host system can have a central processing unit (CPU) in communication with the one or more memory sub-systems to store and/or retrieve data and instructions. Instructions for a computer can include operating systems, device drivers, and application programs. An operating system manages resources in the computer and provides common services for application programs, such as memory allocation and time sharing of the resources. A device driver operates or controls a particular type of devices in the computer; and the operating system uses the device driver to offer resources and/or services provided by the type of devices. A central processing unit (CPU) of a computer system can run an operating system and device drivers to provide the services and/or resources to application programs. The central processing unit (CPU) can run an application program that uses the services and/or resources. For example, an application program implementing a type of applications of computer systems can instruct the central processing unit (CPU) to store data in the memory components of a memory sub-system and retrieve data from the memory components.

An operating system of a computer system can allow an application program to use virtual addresses of memory to store data in, or retrieve data from, memory components of one or more memory sub-systems of the computer system. The operating system maps the virtual addresses to physical addresses of one or more memory sub-systems connected to the central processing unit (CPU) of the computer system. The operating system implements the memory accesses specified at virtual addresses using the physical addresses of the memory sub-systems.

A virtual address space can be divided into pages. A page of virtual memory can be mapped to a page of physical memory in the memory sub-systems. The operating system can use a paging technique to access a page of memory in a storage device via a page of memory in a memory module. At different time instances, the same page of memory in a memory module can be used as proxy to access different pages of memory in the storage device or another storage device in the computer system.

A computer system can include a hypervisor (or virtual machine monitor) to create or provision virtual machines. A virtual machine is a computing device that is virtually implemented using the resources and services available in the computer system. The hypervisor presents the virtual machine to an operating system as if the components of virtual machine were dedicated physical components. A guest operating system runs in the virtual machine to manage resources and services available in the virtual machine, in a way similar to the host operating system running in the computer system. The hypervisor allows multiple virtual machines to share the resources of the computer system and allows the virtual machines to operate on the computer substantially independently from each other.

BRIEF DESCRIPTION OF THE DRAWINGS

The embodiments are illustrated by way of example and not limitation in the figures of the accompanying drawings in which like references indicate similar elements.

DETAILED DESCRIPTION

At least some aspects of the present disclosure are directed to a predictive paging technique that can accelerate of memory access in a computer system having one or more memory sub-systems. A memory sub-system is also hereinafter referred to as a "memory device". An example of a memory sub-system is a memory module that is connected to a central processing unit (CPU) via a memory bus. Examples of memory modules include a dual in-line memory module (DIMM), a small outline DIMM (SO-DIMM), a non-volatile dual in-line memory module (NVDIMM), etc. Another example of a memory sub-system is a storage device that is connected to the central processing unit (CPU) via a peripheral interconnect (e.g., an input/output bus, a storage area network). Examples of storage devices include a solid-state drive (SSD), a flash drive, a universal serial bus (USB) flash drive, and a hard disk drive (HDD). In some embodiments, the memory sub-system is a hybrid memory/storage sub-system that provides both memory functions and storage functions. In general, a host system can utilize a memory sub-system that includes one or more memory components. The host system can provide data to be stored at the memory sub-system and can request data to be retrieved from the memory sub-system.

A conventional system can use a storage device, such as a hard drive, as virtual memory that is accessed through a memory module, such as DRAM. When an application accesses a page of virtual memory that is on the hard drive, the operating system can load the page from the hard drive to the DRAM and remap the page of the virtual memory to DRAM. Accessing data in the DRAM is faster than accessing data in the hard drive. Thus, after the page of the virtual memory is remapped to the DRAM, the application can access the data in the page of virtual memory with improved performance. However, the memory access performance is not optimal when the page of virtual memory is remapped from the hard drive to the DRAM.

At least some aspects of the present disclosure address the above and other deficiencies by predicting the usages of pages of virtual memory. A predictive model can be self-trained using a supervised machine learning technique. The training can be performed using the actual usage history during a preceding time period for a subsequent time period. The predictive model predicts hot pages that are likely to be used and cold pages that are unlikely to be used in the subsequent time period. A hot page can be remapped from slower memory to faster memory, such that when the page is used, the page is already in the faster memory. A waiting period for remapping the page can be eliminated. A cold page can be remapped from the faster memory to the slower memory to make room in the faster memory for another hot page. Thus, the overall memory access can be accelerated through the predictive loading and unloading of pages of virtual memory.

Figure 1:
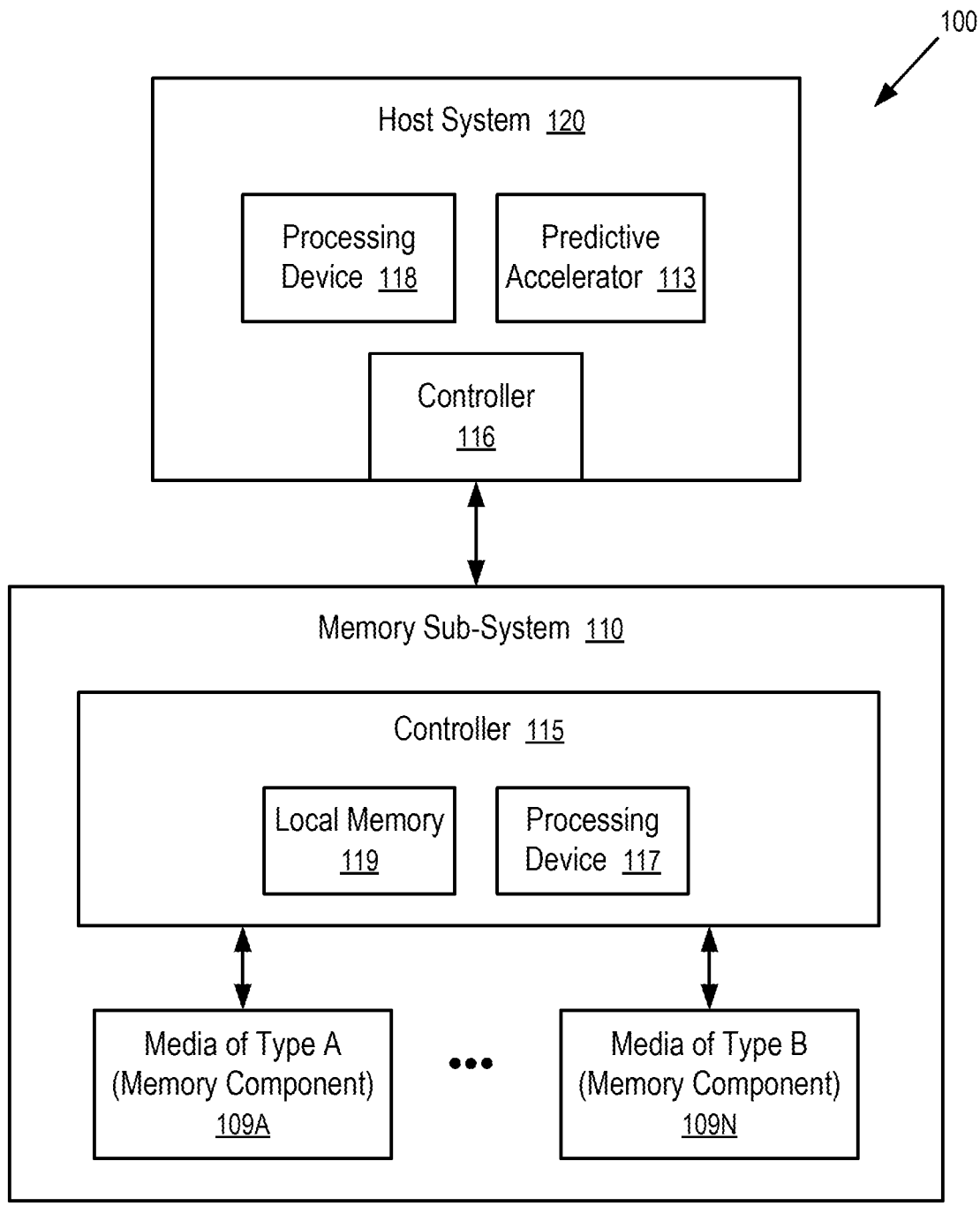
FIG. 1 illustrates an example computing system having a memory sub-system in accordance with some embodiments of the present disclosure.

FIG. 1 illustrates an example computing system 100 having a memory sub-system 110 in accordance with some embodiments of the present disclosure. The memory sub-system 110 can include media, such as memory components 109A to 109N. The memory components 109A to 109N can be volatile memory components, non-volatile memory components, or a combination of such. In some embodiments, the memory sub-system 110 is a memory module. Examples of a memory module includes a DIMM, NVDIMM, and NVDIMM-P. In some embodiments, the memory sub-system is a storage system. An example of a storage system is an SSD. In some embodiments, the memory sub-system 110 is a hybrid memory/storage sub-system. In general, the computing environment can include a host system 120 that uses the memory sub-system 110. For example, the host system 120 can write data to the memory sub-system 110 and read data from the memory sub-system 110.

The host system 120 can be a computing device such as a desktop computer, laptop computer, network server, mobile device, or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, etc. The physical host interface can be used to transmit data between the host system 120 and the memory sub-system 110. The host system 120 can further utilize an NVM Express (NVMe) interface to access the memory components 109A to 109N when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The host system 120 includes a processing device 118 and a controller 116. The processing device 118 of the host system 120 can be, for example, a microprocessor, a central processing unit (CPU), a processing core of a processor, an execution unit, etc. In some instances, the controller 116 can be referred to as a memory controller, a memory management unit, and/or an initiator. In one example, the controller 116 controls the communications over a bus coupled between the host system 120 and the memory sub-system 110.

In general, the controller 116 can send commands or requests to the memory sub-system 110 for desired access to memory components 109A to 109N. The controller 116 can further include interface circuitry to communicate with the memory sub-system 110. The interface circuitry can convert responses received from memory sub-system 110 into information for the host system 120.

The controller 116 of the host system 120 can communicate with controller 115 of the memory sub-system 110 to perform operations such as reading data, writing data, or erasing data at the memory components 109A to 109N and other such operations. In some instances, the controller 116 is integrated within the same package of the processing device 118. In other instances, the controller 116 is separate from the package of the processing device 118. The controller 116 and/or the processing device 118 can include hardware such as one or more integrated circuits and/or discrete components, a buffer memory, a cache memory, or a combination thereof. The controller 116 and/or the processing device 118 can be a microcontroller, special purpose logic circuitry (e.g., a field programmable gate array (FPGA), an application specific integrated circuit (ASIC), etc.), or another suitable processor.

The memory components 109A to 109N can include any combination of the different types of non-volatile memory components and/or volatile memory components. An example of non-volatile memory components includes a negative-and (NAND) type flash memory. Each of the memory components 109A to 109N can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and a MLC portion of memory cells. Each of the memory cells can store one or more bits of data (e.g., data blocks) used by the host system 120. Although non-volatile memory components such as NAND type flash memory are described, the memory components 109A to 109N can be based on any other type of memory such as a volatile memory. In some embodiments, the memory components 109A to 109N can be, but are not limited to, random access memory (RAM), read-only memory (ROM), dynamic random access memory (DRAM), synchronous dynamic random access memory (SDRAM), phase change memory (PCM), magneto random access memory (MRAM), Spin Transfer Torque (STT)-MRAM, ferroelectric random-access memory (FeTRAM), ferroelectric RAM (FeRAM), conductive bridging RAM (CBRAM), resistive random access memory (RRAM), oxide based RRAM (OxRAM), negative-or (NOR) flash memory, electrically erasable programmable read-only memory (EEPROM), nanowire-based non-volatile memory, memory that incorporates memristor technology, and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components 109A to 109N can be grouped as memory pages or data blocks that can refer to a unit of the memory component used to store data.

The controller 115 of the memory sub-system 110 can communicate with the memory components 109A to 109N to perform operations such as reading data, writing data, or erasing data at the memory components 109A to 109N and other such operations (e.g., in response to commands scheduled on a command bus by controller 116). The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or another suitable processor. The controller 115 can include a processing device 117 (processor) configured to execute instructions stored in local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the controller 115, in another embodiment of the present disclosure, a memory sub-system 110 may not include a controller 115, and can instead rely upon external control (e.g., provided by an external host, or by a processor or controller separate from the memory sub-system).

In general, the controller 115 can receive commands or operations from the host system 120 and can convert the commands or operations into instructions or appropriate commands to achieve the desired access to the memory components 109A to 109N. The controller 115 can be responsible for other operations such as wear leveling operations, garbage collection operations, error detection and error-correcting code (ECC) operations, encryption operations, caching operations, and address translations between a logical block address and a physical block address that are associated with the memory components 109A to 109N. The controller 115 can further include host interface circuitry to communicate with the host system 120 via the physical host interface. The host interface circuitry can convert the commands received from the host system into command instructions to access the memory components 109A to 109N as well as convert responses associated with the memory components 109A to 109N into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory components 109A to 109N.

The computing system 100 includes a predictive accelerator 113 in the host system 120 that can perform predictive loading and/or unloading of pages of virtual memory between faster memory (e.g., 109A) and slower memory (e.g., 109N). In some embodiments, the controller 116 and/or the processing device 118 in the host system 120 includes at least a portion of the predictive accelerator 113. For example, the controller 116 and/or the processing device 118 can include logic circuitry implementing the predictive accelerator 113. For example, the processing device 118 (processor) of the host system 120 can be configured to execute instructions stored in memory for performing the operations of the predictive accelerator 113 described herein. In some embodiments, the predictive accelerator 113 is part of an operating system of the host system 120, a device driver, or an application.

The predictive accelerator 113 can perform adaptive training of a predictive model in predicting hot pages of virtual memory that will be used soon and cold pages of virtual memory that will not be used for a period of time. The predictive accelerator 113 performs the training using the actual usage history of pages of virtual memory that are mapped to the memory components 109A to 109N in a period of time. The prediction from the model is used to remap hot pages from slower memory (e.g., 109N) to faster memory (e.g., 109A) before the hot pages are requested. Predicted cold pages can be remapped from the faster memory (e.g., 109A) to the slower memory (e.g., 109N) to make room for hot pages. The prediction eliminates and/or reduces the waiting period for remapping requested pages from the slower memory (e.g., 109N) to the faster memory (e.g., 109A) for accelerated memory access. Further details with regards to the operations of the predictive accelerator 113 are described below.

In one example, the central processing unit (CPU) can access two sets of memory provided in one or more memory systems connected to the CPU. For example, one set of memory can be slower than the other set of memory; and the central processing unit (CPU) can be configured to access the slower set of memory via the faster set of memory using a paging technique. For example, one set of memory can not be directly addressable by the CPU and is coupled to the other set of memory that is directly addressable by the CPU; and the central processing unit (CPU) can be configured to access a set of memory that is not directly addressable via the set of memory that is directly addressable in a way similar to the use of the paging technique.

When a page of virtual memory being accessed is currently in the slower set of memory but not in the faster set of memory, a page can be allocated from the faster set of memory to service the page in the slower set of memory; and a device driver is used to fetch the data of the page from the slower set of memory, store the fetched page of data in the allocated page in the faster set of memory, such that the data access of the page of the virtual memory can be made via accessing the allocated page in the faster set of memory.

Further, the device driver can receive information related to the use of the pages in the slower set of memory, and train a self-learning prediction engine to predict the use of the pages based on such information. For example, a supervised machine learning technique can be used to train, using the information, an artificial neural network to predict the use of the pages in the slower set of memory by reducing the errors between predictions and the actual use of the pages. After the training of the artificial neural network, the prediction engine can use the current information to predict the next pages to be used. Further, the training, prediction, and feedback from the actual usage following the prediction for further training can be performed in a continuous fashion to adapt the prediction model of the artificial neural network to the most recent usage patterns of memory pages.

In response to the engine predicting, based on the trained artificial neural network and the current information, that a page in the slower set of memory is to be used soon, the device driver can pre-fetch the page of data from the slower set of memory, and store the fetched data in an allocated page in the faster set of memory, such that when needed for processing, the page of data is already in the faster set of memory, which arrangement improves the data access speed of the page of data.

The accuracy of the prediction can be measured against the subsequent actual page use; and the prediction and the subsequent actual page use can be used to further train or adjust the artificial neural network to track the most recent usage patterns of memory pages.

Alternatively, or in combination, the machine learning-based prediction can be replaced or augmented with policy based prediction rules. For example, pages storing resident codes (e.g., in lower addresses) can be maintained in the faster set of memory when possible to reduce swapping of frequently used pages. For example, a huge page can be loaded into the faster set of memory when a page that is a portion of the huge page is being accessed. For example, predictions can be made at least in part using heuristic rules, based on indications such as whether the pages are accessed sequentially or randomly, whether the data access is in a steady state mode or in a bursty mode, and/or the logical relations between pages (and pages of different sizes).

Figure 2:
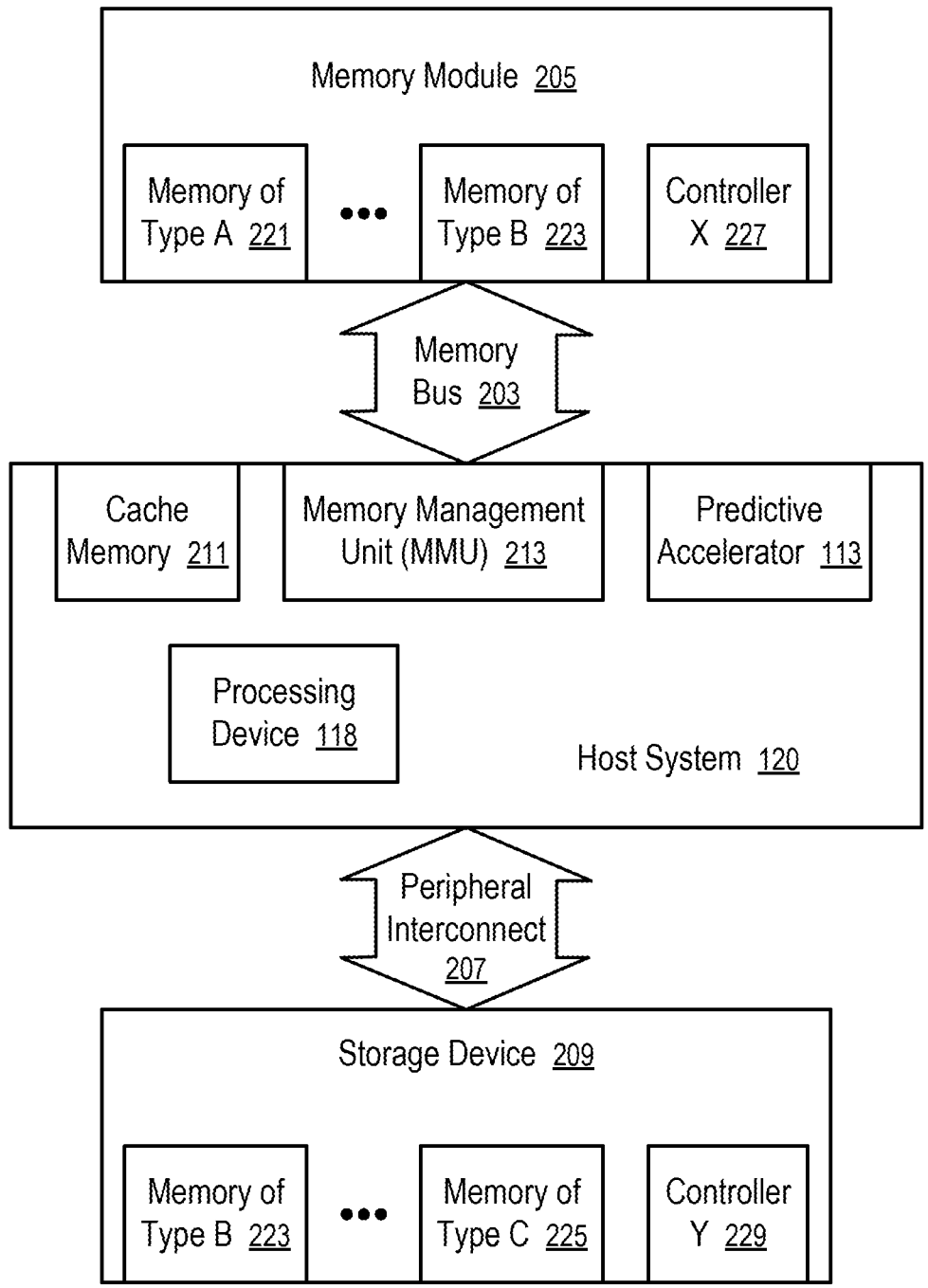
FIG. 2 shows a computing system having different types of memory and running instructions to accelerate memory access in accordance with at least some embodiments disclosed herein.

FIG. 2 shows a computing system having different types of memory and running instructions to accelerate memory access in accordance with at least some embodiments disclosed herein.

The computing system of FIG. 2 includes a host system 120, a memory module 205 connected to the host system 120 via a memory bus 203, and a storage device 209 connected to the host system 120 via a peripheral interconnect 207. The storage device 209 and the memory module 205 are examples of the memory sub-system 110 illustrated in FIG. 1.

The host system 120 has a processing device 118, which can be a central processing unit or a microprocessor with one or more processing cores. The host system 120 can have a memory management unit 213 and cache memory 211. The memory management unit 213 and/or at least a portion of the cache memory 211 can be optionally integrated within the same integrated circuit package of the processing device 118.

The memory module 205 illustrated in FIG. 2 has multiple types of memory (e.g., 221 and 223). For example, memory of type A 221 is faster than memory of type B 223.

The memory bus 203 typically operates at a speed faster than the peripheral interconnect 207. For example, the memory bus 203 can be a double data rate bus; and the peripheral interconnect 207 can be a peripheral component interconnect express (PCIe) bus, a serial advanced technology attachment (SATA) bus, a universal serial bus (USB) bus, and/or a storage area network. Memory of type B 223 in the memory module 205 can be accessed at a speed faster than accessing memory of type B 223 in the storage device 209.

The storage device 209 illustrated in FIG. 2 has multiple types of memory (e.g., 223 and 225). For example, memory type B 223 is faster than memory type C 225.

In general, a plurality of memory modules (e.g., 205) can be coupled to the memory bus 203; and a plurality of storage devices (e.g., 209) can be coupled to the peripheral interconnect 207. In some instances, the peripheral interconnect 207 and the storage devices (e.g., 209) are optional and can be absent from the computing system. In other instances, the memory bus 203 the memory modules (e.g., 205) can be optional and can be absent from the computing system.

In a possible configuration when a plurality of memory modules (e.g., 205) are coupled to the memory bus 203, one of the memory modules (e.g., 205) has memory of type A 221; and another of the memory modules has memory of type B 223 that is accessible at a speed lower than the memory of type A 221 in a separate memory module (e.g., 205).

Similarly, in a possible configuration when a plurality of storage devices (e.g., 205) are coupled to the peripheral interconnect 207, one of the storage device (e.g., 209) has memory of type B 223, and another of the storage devices has memory of type C 225 that is accessible at a speed lower than the memory of type B 221 in a separate storage device (e.g., 209).

The processing device 118 and/or the MMU 213 are configured via instructions (e.g., an operating system and/or one or more device drivers) to access a portion of memory in the computer system via another portion of memory in the computer system using a paging technique and/or a memory map interface.

For example, memory of type B 223 of the memory module 205 can be accessed via memory of type A 221 of the memory module 205 (or another memory module).

For example, memory of type B 223 of the storage device 207 can be accessed via memory of type A 221 of the memory module 205 and/or via memory of type B 223 of the memory module 205.

For example, memory of type C 225 of the storage device 207 can be accessed via memory of type A 221 of the memory module 205, via memory of type B 223 of the memory module 205, and/or via memory of type B 223 of the storage device 207 (or another storage device).

For example, in some instances, memory of type A 221 and memory of type B 223 in the same memory module 205 (or different memory modules) are addressable directly and separately over the memory bus 203 by the memory management unit 213 of the processing device 118. However, since the memory of type B 223 is slower than memory of type A 221, it is desirable to access the memory type B 223 via the memory of type A 221.

In other instances, memory of type B 223 of the memory module 205 is accessible only through addressing the memory of type A 221 of the memory module 205 (e.g., due to the size restriction in the address portion of the memory bus 203).

A controller X 227 can be provided in the memory module 205 to manage data transfer between the memory of type A 221 and the memory of type B 223 within the memory module 205, especially when the memory of type B 223 of the memory module 205 is not directly addressable using the memory bus 203.

In one variation, the memory (e.g., 221 and 223) of the memory module 205 can have the same performance individually within the memory module 205; however, the memory management unit 213 and/or the processing device 118 are restricted to access via the memory 223 via the memory 221 (e.g., due to the size restriction in the address portion of the memory bus 203). Thus, the memory 223 appears to be slower than the memory 221 to the processing device 118.

In general, the memory sub-systems (e.g., 205 and 209) can include media, such as memory (e.g., 221, . . . , 223, . . . , 225). The memory (e.g., 221, . . . , 223, . . . , 225) can includes volatile memory, non-volatile memory (NVM), and/or a combination of such. In some embodiments, the computer system includes at least one memory sub-system that is a storage device 209. An example of a storage device 209 is a solid-state drive (SSD). In some embodiments, the computer system includes at least one memory sub-system that is a hybrid memory/storage system configured as a memory module 205. The processing device 118 can write data to each of the memory sub-systems (e.g., 205 and 209) and read data from the memory sub-systems (e.g., 205 and 209) directly or indirectly.

The computing system of FIG. 2 can be used to implement a desktop computer, laptop computer, network server, mobile device, or such computing device that includes a memory and a processing device. The processing device 118 can read data from or write data to the memory sub-systems (e.g., 205 and 209).

The processing device 118 can be coupled to a memory sub-system (e.g., 209) via one or more physical interface (e.g., 203, 207).

As used herein, "coupled to" generally refers to a connection between components, which can be an indirect communicative connection or direct communicative connection (e.g., without intervening components), whether wired or wireless, including connections such as, electrical, optical, magnetic, etc.

Examples of a physical host interface include, but are not limited to, a serial advanced technology attachment (SATA) interface, a peripheral component interconnect express (PCIe) interface, universal serial bus (USB) interface, Fibre Channel, Small Computer System Interface (SCSI), Serial Attached SCSI (SAS), etc.

The physical host interface can be used to transmit data between the processing device 118 and the memory sub-system (e.g., 209). The computer system can further utilize an NVM Express (NVMe) interface to access the memory (e.g., 223, . . . , 225) when the memory sub-system 209 is coupled with the peripheral interconnect 207 via the PCIe interface. The physical host interface can provide an interface for passing control, address, data, and other signals between the memory sub-system (e.g., 209) and the processing device 118.

In general, a memory sub-system (e.g., 205 and 209) includes a printed circuit board that connects a set of memory devices, such as memory integrated circuits, that provides the memory (e.g., 221, . . . , 223, . . . , 225). The memory (e.g., 221, . . . , 223, . . . , 225) on the memory sub-system (e.g., 205 and 209) can include any combination of the different types of non-volatile memory devices and/or volatile memory devices.

An example of non-volatile memory devices includes a negative-and (NAND) type flash memory or a negative-or (NOR) type flash memory. A memory integrated circuit can include one or more arrays of memory cells, such as single level cells (SLCs), multi-level cells (MLCs), triple level cells (TLCs), quad-level cells (QLCs), etc. In some implementations, a particular memory device can include both an SLC portion and a MLC (or TLC or QLC) portion of memory cells. Each of the memory cells can store one or more bits of data used by the host system 120. Although non-volatile memory devices such as NAND type flash memory are described, the memory integrated circuits can be based on any other type of memory such as a volatile memory. In some implementations, the memory (e.g., 221, . . . , 223, . . . , 225) can include, but are not limited to, random access memory (RAM), read-only memory (ROM), dynamic random access memory (DRAM), static random access memory (SRAM), synchronous dynamic random access memory (SDRAM), phase change memory (PCM), magneto random access memory (MRAM), negative-or (NOR) flash memory, electrically erasable programmable read-only memory (EEPROM), and/or a cross-point array of non-volatile memory cells. A cross-point array of non-volatile memory can perform bit storage based on a change of bulk resistance, in conjunction with a stackable cross-gridded data access array. Additionally, in contrast to many Flash-based memory, cross point non-volatile memory can perform a write in-place operation, where a non-volatile memory cell can be programmed without the non-volatile memory cell being previously erased. Furthermore, the memory cells of the memory devices can be grouped as memory pages or data blocks that can refer to a unit of the memory device used to store data.

A memory sub-system (e.g., 205 or 209) can have a controller (e.g., 227 or 229) that communicate with the memory (e.g., 221, . . . , 223, . . . , 225) to perform operations such as reading data, writing data, or erasing data in the memory (e.g., 221, . . . , 223, . . . , 225) and other such operations, in response to requests, commands or instructions from the processing device 118 and/or the memory management unit (MMU) 213. The controller (e.g., 227 or 229) can include hardware such as one or more integrated circuits and/or discrete components, a buffer memory, or a combination thereof. The controller (e.g., 227 or 229) can be a microcontroller, special purpose logic circuitry (e.g., a field programmable gate array (FPGA), an application specific integrated circuit (ASIC), etc.), or another suitable processor. The controller (e.g., 227 or 229) can include one or more processors (processing devices) configured to execute instructions stored in local memory.

The local memory of the controller (e.g., 227 or 229) can include an embedded memory configured to store instructions for performing various processes, operations, logic flows, and routines that control operation of the memory sub-system (e.g., 205 or 209), including handling communications between the memory sub-system (e.g., 205 or 209) and the processing device 118/MMU 213, and other functions described in greater detail below. The local memory 219 of the controller (e.g., 227 or 229) can include read-only memory (ROM) for storing micro-code and/or memory registers storing, e.g., memory pointers, fetched data, etc.

While the example memory sub-systems (e.g., 205 and 209) in FIG. 2 have been illustrated as including controllers (e.g., 227 and 229), in another embodiment of the present disclosure, a memory sub-system (e.g., 205 or 209) may not include a controller (e.g., 227 or 229), and can instead rely upon external control (e.g., provided by the MMU 213, or by a processor or controller separate from the memory sub-system (e.g., 205 or 209)).

In general, the controller (e.g., 227 or 229) can receive commands, requests or instructions from the processing device 118 or MMU 213 in accordance with a standard communication protocol for the communication channel (e.g., 203 or 207) and can convert the commands, requests or instructions in compliance with the standard protocol into detailed instructions or appropriate commands within the memory sub-system (e.g., 205 or 209) to achieve the desired access to the memory (e.g., 221, ..., 223, ..., 225). For example, the controller (e.g., 227 or 229) can be responsible for operations such as wear leveling operations, garbage collection operations, error detection and error-correcting code (ECC) operations, encryption operations, caching operations, and address translations between a logical block address and a physical block address that are associated with the memory (e.g., 221, ..., 223, ..., 225). The controller (e.g., 227 or 229) can further include host interface circuitry to communicate with the processing device 118 via the physical host interface. The host interface circuitry can convert the commands received from the processing device 118 into command instructions to access the memory devices (e.g., 221, ..., 223, ..., 225) as well as convert responses associated with the memory devices (e.g., 221, ..., 223, ..., 225) into information for the processing device 118.

The memory sub-system (e.g., 205 or 209) can also include additional circuitry or components that are not illustrated. In some implementations, the memory sub-system (e.g., 205 or 209) can include a cache or buffer (e.g., DRAM) and address circuitry (e.g., a row decoder and a column decoder) that can receive an address from the controller (e.g., 227 or 229) or the MMU 213 and decode the address to access the memory (e.g., 221, ..., 223, ..., 225).

In one example, the peripheral interconnect 207, or the memory bus 203, has one or more connectors to provide the memory sub-system (e.g., 209 or 205) with power and/or communicate with the memory sub-system (e.g., 209 or 205) via a predetermined protocol; and the memory sub-system (e.g., 209 or 205) has one or more connectors to receive the power, data and commands from the processing device 118. For example, the connection between the connector on the peripheral interconnect 207 and the connector on a memory sub-system (e.g., 209) can utilize a PCIe bus or a SATA bus.

In general, the processing device 118 can execute one or more operating systems to provide services, including acceleration of memory access in which a portion of memory in the computer system is accessed via another portion of memory in the computer system using a paging technique and/or a memory map interface, as further discussed below.

Figure 3:
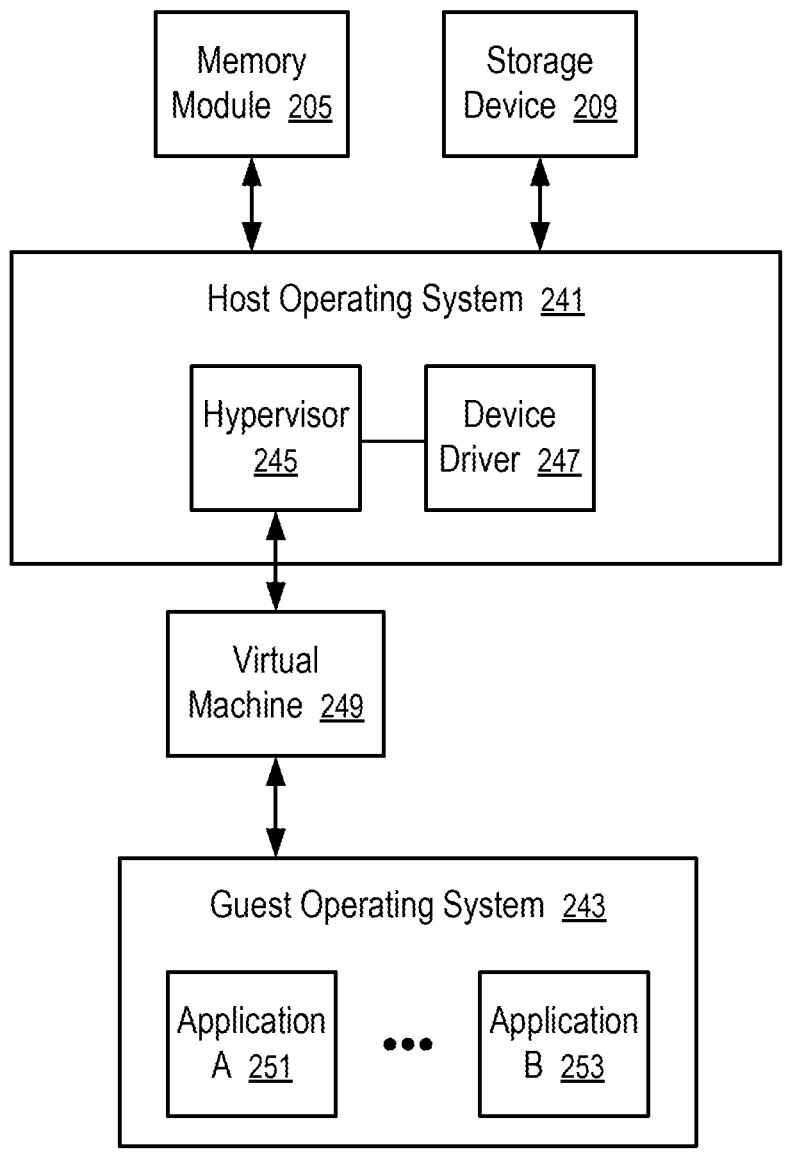
FIG. 3 shows a system having a device driver configured to accelerate memory access made via a hypervisor.

FIG. 3 shows a system having a device driver 247 configured to accelerate memory access made via a hypervisor 245. For example, the system of FIG. 3 can be implemented in a computer system of FIG. 1 or 2.

The system of FIG. 3 includes a host operating system 241 that can run in the processing device 118 of the computer system of FIG. 1 or 2. The host operating system 241 includes one or more device drives (e.g., 247) that provides memory services using the memory (e.g., 221, ..., 223, ..., 225) of memory sub-systems, such as the memory module 205 and/or the storage device 209.

The host operating system 241 includes a hypervisor 245 that provisions a virtual machine 249. The virtual machine 249 has virtual hardware implemented via the resources and services provided by the host operating system 241 using the hardware of the computing system of FIG. 1 or 2. For example, the hypervisor 245 can provision virtual memory as part of the virtual machine 249 using a portion of the memory (e.g., 221, ..., 223, ..., 225) of memory sub-systems, such as the memory module 205 and/or the storage device 209.

The virtual machine 249 allows a guest operating system 243 to provide resources and/or services to applications (e.g., 251, ..., 253) running in the guest operating system 243, in a way as the operating system 243 running on a physical computing machine that has the same or similar set of hardware as provisioning in the virtual machine. The hypervisor 245 manages the mapping between the virtual hardware provisioned in the virtual machine and the services of hardware in the computing system managed by the host operating system 241.

FIG. 3 illustrates an instance in which a virtual machine 249 is provisioned by the hypervisor 245. In general, the hypervisor 245 can provision a plurality of virtual machines (e.g., 249) that can run the same guest operating system 243, or different guest operating systems (e.g., 243). Different sets of users and/or application programs can be assigned to use different virtual machines.

In some instances, the host operating system 241 is specialized to provide services for the provisioning of virtual machines and does not run other application programs. Alternatively, the host operating system 241 can provide additional services to support other application programs, such as applications (e.g., 251, ..., 253).

The device driver 247 can be configured to predict the use of a page of slower memory and load the page into faster memory before the page is actually requested for use by the virtual machine 249. The prediction reduces the time between a request to use the page and the availability of the page in the faster memory by loading and/or transferring the page of data from the slower memory to the faster before the request to use the page, which accelerates the data access of the page.

For example, the slower memory can be the memory 223 in the memory module 205 and the faster memory be the memory 221 in the same memory module 205 (or another memory module connected to the same memory bus 203 as the memory module 205).

For example, the slower memory can be the memory 223 in the storage device 209; and the faster memory can be the memory 223 of the same type in the memory module 205, or the memory 221 in the memory module 205.

For example, the slower memory can be the memory 225 in the storage device 209; and the faster memory can be the memory 223 in the same storage device 209 or another storage device connected to the peripheral interconnect 207, or memory (e.g., 223 or 221) in the memory module 205.

Preferably, the predictive pre-fetching of data is performed within a same memory sub-system, such as within the same memory module 205 or the same storage device 209, to avoid or reduce congestion in communication channels connected to the processing device 118, such as the memory bus 203 and/or the peripheral interconnect 207. For example, the pre-fetching can be performed to copy data from the slower memory 223 in the memory module 205 to the faster memory 221 in the memory module 205, under the control of a controller 227 in the memory module 205 in response to one or more command, request, or instruction from the device driver 247 and/or memory management unit (MMU) 213. For example, the pre-fetching can be performed to copy data from the slower memory 225 in the storage device 209 to the faster memory 223 in the storage device 209, under the control of a controller 229 in the storage device 209 in response to one or more command, request, or instruction from the device driver 247 and/or memory management unit (MMU) 213.

In one embodiment, the hypervisor 245 not only requests the device driver 247 to access a memory (e.g., 221, . . . , 223, . . . , or 225) in a memory sub-system (e.g., memory module 205 or storage device 209) but also provides the device driver 247 with information that can be used in making predictions of which pages in the memory (e.g., 221, . . . , 223, . . . , or 225) are likely to be used in a subsequent time period and which pages in the memory (e.g., memory (e.g., 221, . . . , 223, . . . , or 225) are unlikely to be used in the subsequent time period.

For example, a page that is likely to be used can be referred to as a hot page; and a page that is unlikely to be used can be referred to as a cold page. The likelihood of a page being used in the subsequent time period can be referred to as the temperature of the page. The device driver 247 uses the information provided by the hypervisor 245 to predict the temperatures of the pages, moves cold pages from faster memory to slower memory, and moves hot pages from slower memory to faster memory to optimize the distribution of the pages in the memory (e.g., 221, . . . , 223, . . . , or 225) and accelerate data access.

Examples of information provided by the hypervisor 245 and used by the device driver 247 to make the predictions include: sequences of pages being used in a prior time period, instances of requests to load pages from the slower memory to the faster memory, content attributes of the pages, ownership attributes of the pages, identifications of users or applications of the pages, an indication of whether pages are accessed in a sequential mode in a virtual machine and/or in a user account, an indication of whether page accesses are in a steady state, an indication whether a page used is associated with a huge page, etc.

In some instances, a hardware prediction engine with self-learning capability is used by the device driver 247 in making the predictions of the temperatures of the pages.

Figure 4:
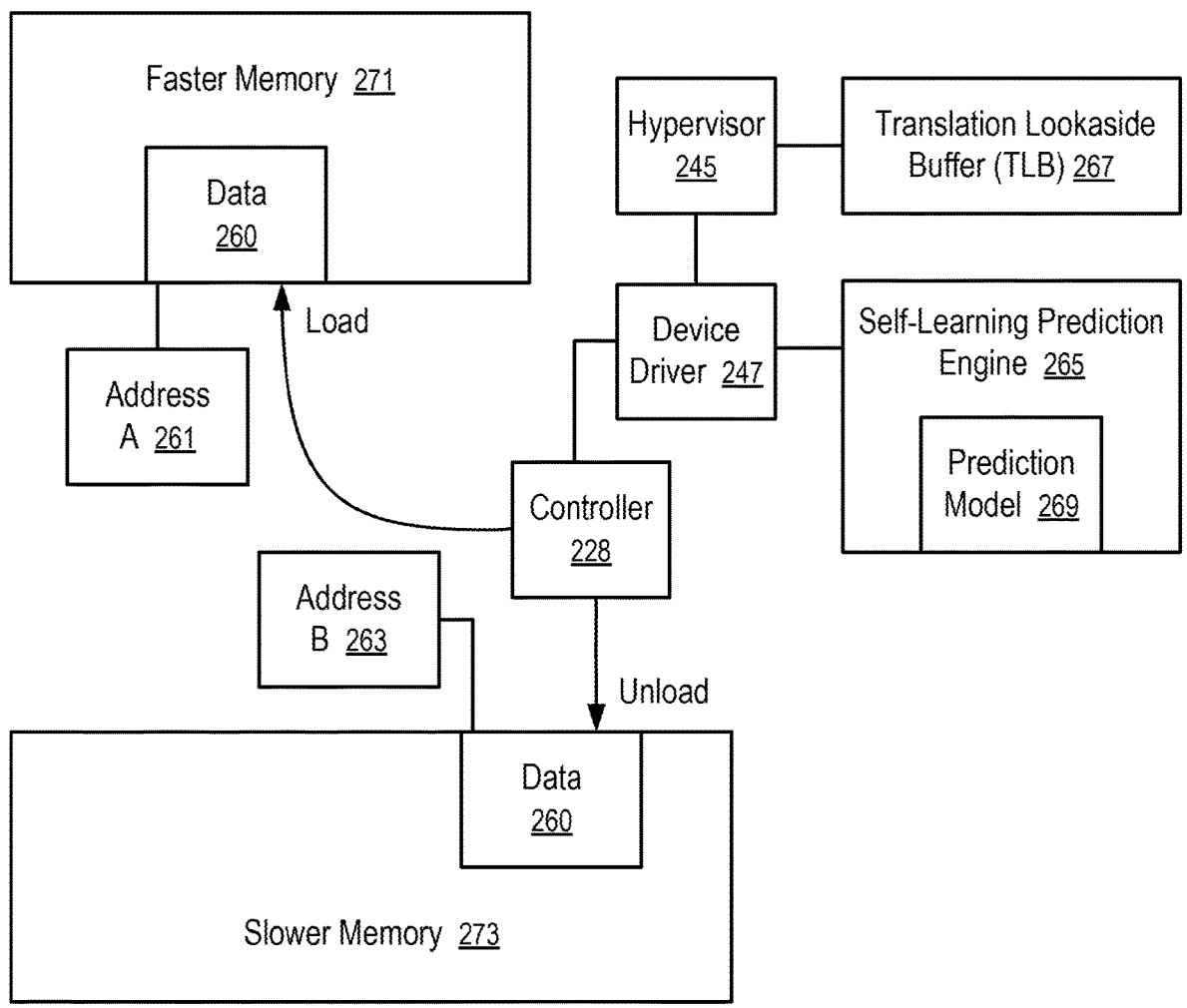
FIG. 4 shows a prediction engine coupled to a device driver to accelerate memory access made via a hypervisor.

FIG. 4 shows a prediction engine 265 coupled to a device driver 247 to accelerate memory access made via a hypervisor 269. For example, the prediction engine 265 of FIG. 4 can be used with the host operating system 241 of FIG. 3 and the memory sub-systems (e.g., 205 and 209) of FIG. 2.

The hypervisor 245 in FIG. 4 is coupled to a translation lookaside buffer (TLB) 267 that defines the mapping between pages of virtual memory provisioned by the hypervisor to the virtual machines (e.g., 249) and the pages in the memory (e.g., 271 or 273).

The processing device 118 can access a page of memory 271 at an address 261 faster than a page of memory 273 at an address 263. It is desirable, and in some instances required, to service the data 260 of a page of the slower memory 273 via a page of the faster memory 271.

When a virtual machine 249 is accessing the data 260 that is in the slower memory 273 but not in the faster memory 271, the hypervisor 245 requests the device driver 247 to load the data 260 from the slower memory 273 to the faster memory 271. The device driver 247 communicates with a controller 228 (e.g., the controller 227 of the memory module 205, the controller 229 of the storage device 229, and/or the memory management unit (MMU) 213) to load the data 260 to the faster memory 271. Once the data 260 is in the faster memory 271, the hypervisor 245 can update the translation lookaside buffer (TLB) 267 to allow the translation of the virtual address of the page to the address 261 of the faster memory 271 such that the data 260 can be read and/or modified in the faster memory 271.

When the data 260 is not being used, the data 260 can be unloaded back to the slower memory 273, to save the changes made to the data 260 while the data 260 is being used in the faster memory 271.

The hypervisor 245 provides information to the device driver 247 and/or the self-learning prediction engine 265 to train a prediction model 269 in the prediction engine 265. Such information can include page access history, the identifications of users, programs and/or virtual machines that use the pages, and attributes of pages, such as locality, time, ownership, usage mode, logical relations among the pages (e.g., identifications of pages that are used together to represent an object), the type of data contained in the pages (e.g., operating system, application program, software tool, system data, user data), and/or other meta data of pages.

For example, the prediction model 269 can be constructed using an artificial neural network, or another machine learning model. A supervised machine learning technique can be used to predict the temperatures of the pages in the slower memory 273 and minimize the predicted temperatures and measured temperatures of the pages as indicated in the actual usages of the pages as observed in the hypervisor 245. In some instances, the temperature of a page at a time instance is inversely proportional to the closest subsequent time instance the page is to be used. A time gap to the use smaller than a threshold corresponds to a very hot temperature and thus represents an elevated need or priority for fetching the page to the faster memory 271. A time gap to the use larger than another threshold corresponds to a very cold temperature and thus represents an opportunity to unload the page from the faster memory 271 and make room in the faster memory 271 for other hot pages.

Further, the prediction model 269 can be continuously trained based on the ongoing information about the page usages and the identifications of the actually used pages. The actual usages following the predictions provide feedback regarding the accuracy of the predictions; and the prediction model 269 can be continuously trained to minimize the prediction errors based on the most recent time period of usages.

When the prediction engine 265 identifies a hot page that is not currently in the faster memory 271 and/or a cold page that is currently in the faster memory 271, the device driver 247 loads the data 260 of the hot page into the faster memory 271 in anticipation of the use of the data 260 and/or unloads the data 260 of the cold page into the slower memory 273 to make room in the faster memory 271 for hot pages.

Optionally or in combination, the prediction engine 265 uses heuristic rules to aid predictive data positioning. The heuristic rules can be based on whether an application or virtual machine is accessing pages of data sequentially or randomly, whether the application or virtual machine is accessing pages of data in a steady state mode or in a bursty mode, whether the application or virtual machine is accessing pages of data through small pages or huge pages, etc.

FIG. 4 illustrates the training of the self-learning prediction engine 265 through information provided by a hypervisor 245. In general, the software tool in the host operating system 241 can be used to provide information about the page usage history and/or page information to train the self-learning prediction engine 265 with or without the hypervisor 245. For example, the predictive data fetching technique can be used in an operating system that runs a plurality of application programs but does not have the hypervisor 245 and does not offer virtual machines (e.g., 249).

Preferably, the prediction engine 265 can be implemented using a hardware circuitry separate from the processing device 118 and/or the controllers (e.g., 213, 227, 229, 228). For example, an Application-Specific Integrated Circuit (ASIC) or Field-Programmable Gate Array (FPGA) can be used to implement the prediction engine 265.

Alternatively, the prediction engine 265 can be implemented as a part of the processing device 118, or a processor coupled to the processing device 118.

In some instances, the prediction engine 265 is implemented in the controller 228 of a memory sub-system, such as the controller 227 of a memory module 205 or the controller 229 of a storage device 209.

Figure 5:
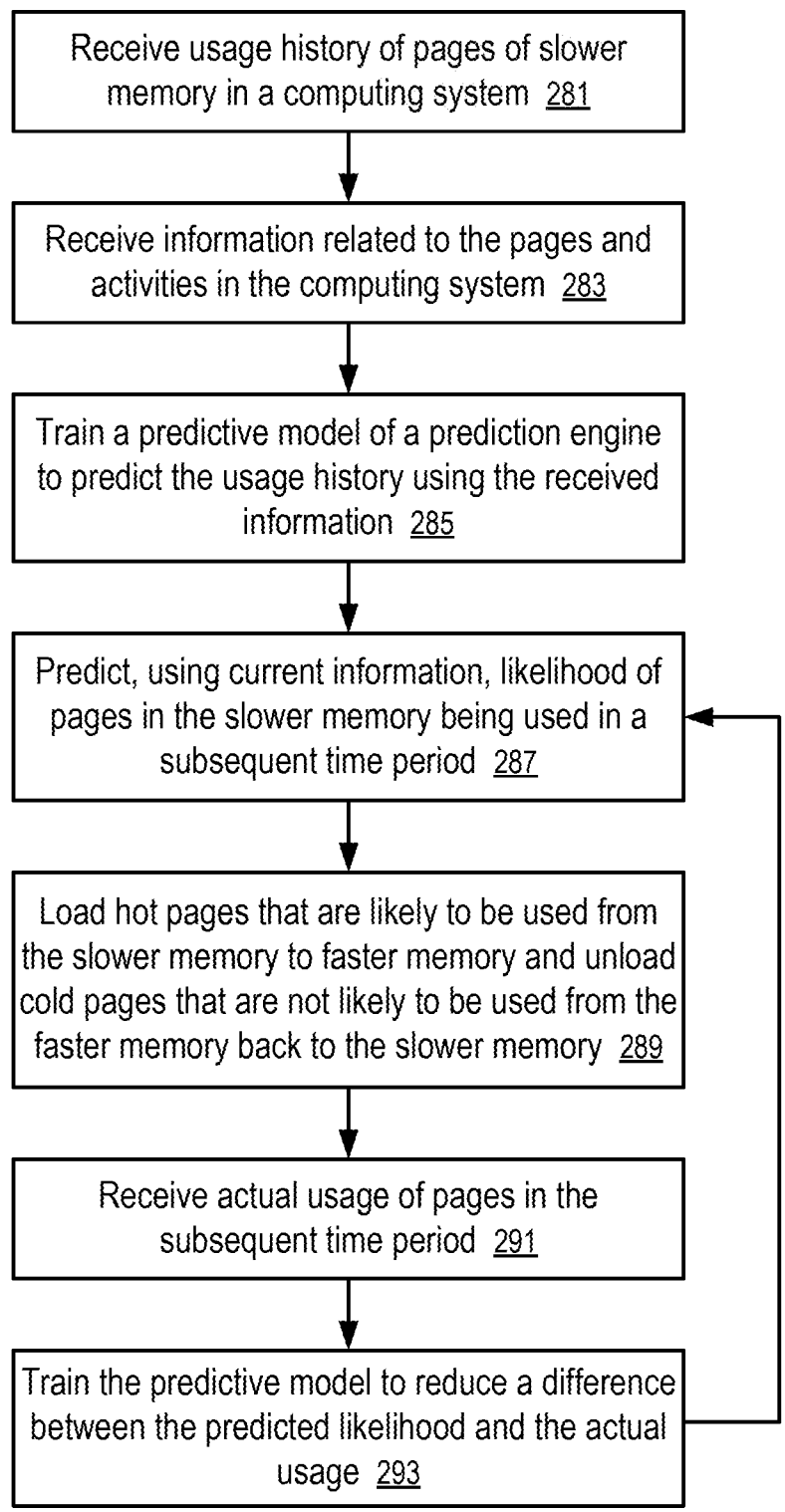
FIGS. 5-6 show methods to accelerate memory access.
Figure 6:
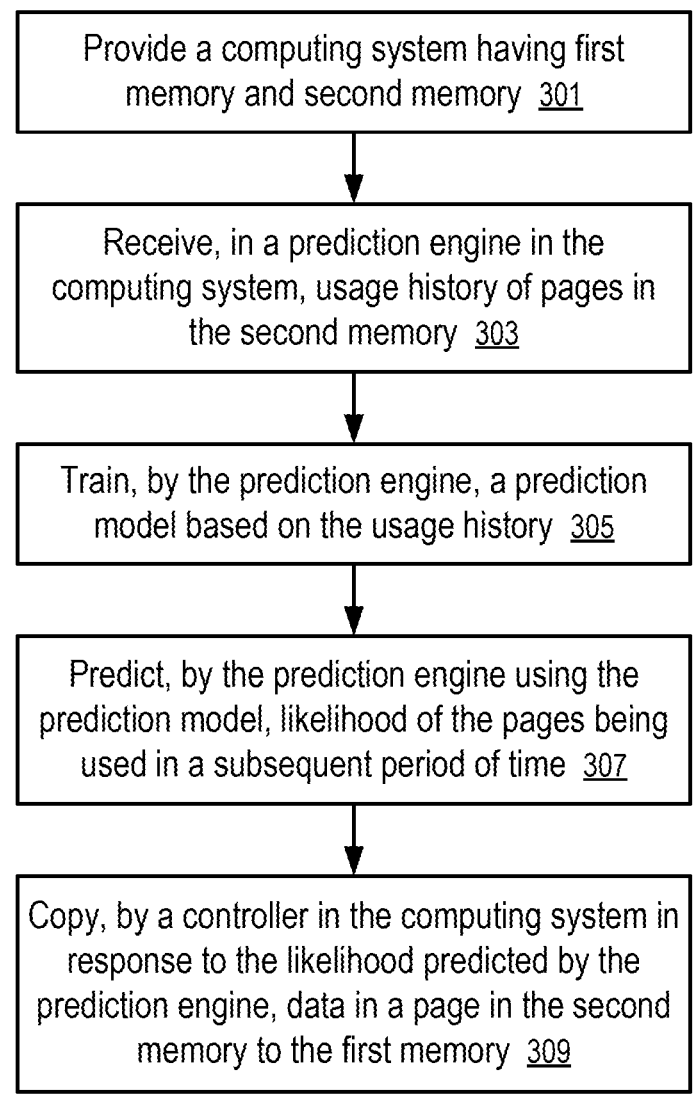

FIGS. 5-6 show methods to accelerate memory access. The method of FIG. 5 or 6 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method of FIG. 5 or 6 is performed at least in part by the predictive accelerator 113 of FIG. 1 or 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

For example, the method of FIG. 5 or 6 can be implemented in a computing system of FIG. 1 or 2 with a host operating system 241 of FIG. 3 and a self-learning prediction engine 265 of FIG. 4. For example, the predictive accelerator 113 can be implemented at least in part via the self-learning prediction engine 265 of FIG. 4 and the host operating system 241 of FIG. 3.

At block 281 in FIG. 5, a predictive accelerator 113 receives usage history of pages of slower memory 273 in a computing system (e.g., illustrated in FIG. 2).

At block 283, the predictive accelerator 113 receives information related to the pages and activities in the computing system.

At block 285, the predictive accelerator 113 trains 285 a predictive model 269 of a prediction engine 265 to predict the usage history using the received information.

At block 287, the predictive accelerator 113 predicts, using current information, likelihood/temperatures of pages in the slower memory 273 being used in a subsequent time period.

At block 289, the predictive accelerator 113 loads hot pages that are likely to be used from the slower memory to faster memory 271 and unload cold pages that are not likely to be used from the faster memory 271 back to the slower memory 273.

At block 291, the predictive accelerator 113 receives actual usage of pages in the subsequent time period.

At block 293, the predictive accelerator 113 further trains the predictive model 269 to reduce a difference between the predicted likelihood/temperatures and the actual usage.

For example, the prediction of the likelihood/temperatures of pages being used in a particular period of time can be made based on the actual usage of pages in a time period leading to the particular period of time, the attributes of used pages, and/or the activity information in the computing system that can be indicative of usage patterns of pages.

The actual usage in the particular period of time provides a feedback to correct the prediction and can be used to further train the predictive model 269 of the self-learning prediction engine 265. Further, the actual usage in the particular period of time provides the basis for the prediction made for a time period following the particular period of time, in view of other information that become available during the particular period of time, such as the attributes of pages actually used in the particular period of time, and/or the activity information in the computing system during the particular period of time.

In some instances, the prediction is made based on the usage history in an immediate preceding time period and attributes of the usage pages without further information about the activities in the computing system. Optional, further information on activities in the computing system is also used in the prediction model 269.

At block 301 in FIG. 6, a computing system provides first memory (e.g., 271) and second memory (e.g., 273).

At block 303, a prediction engine 265 in the computing system receives usage history of pages in the second memory (e.g., 273).

At block 306, the prediction engine 265 trains a prediction model 269 based on the usage history.

At block 307, the prediction engine 265 predicts, using the prediction model 269, likelihood of the pages being used in a subsequent period of time.

At block 309, the prediction engine 265 causes a controller (e.g., 213, 227 and/or 229) to copy, in response to the likelihood predicted by the prediction engine, data in a page in the second memory (e.g., 273) to the first memory (e.g., 271).

For example, a computing system has first memory 271 and second memory 272, a prediction engine 265, and a controller 228. The prediction engine 265 receives usage history of pages in the second memory 273, trains a prediction model 269 based on the usage history, and predicts using the prediction model 269 likelihood of the pages being used in a subsequent period of time. Responsive to the likelihood predicted by the prediction engine 265, the controller 228 copies/loads data (e.g., 260) in a hot page in the second memory 273 to the first memory 271, and/or saves/unloads data 260 in a cold page to the second memory 273 from the first memory 271.

For example, the hypervisor 245 can generate information that is used in the prediction engine 265 to predict the likelihood; and a device driver 247 configured to operate the second memory 273 receives the information from the hypervisor 245 and use the information in the prediction engine 265 to predict the likelihood. The device driver 247 can provide instructions/requests/commands to the controller 228 to cause the controller 228 to move data between the first memory 271 and the second memory 273.

For example, the first memory 271 and the second memory 273 can be in a same memory module 205 that is connected to a processing device 118 of the computing system via a memory bus 203.

In some instances, the first memory 271 is faster than the second memory 273. In other instances, the first memory 271 and the second memory 273 are of the same type and thus have the same speed within the memory module 205.

For example, the memory module 205 has excessive memory capacity such that the second memory 273 is not directly addressable on the memory bus 203 by the processing device 118. The first memory 271 is a portion of the memory capacity of the memory module 205 that is directly addressable on the memory bus 203. Thus, the first memory 271 provides a window for the processing device 118 and/or the memory management unit (MMU) 213 to access the second memory 273 of the memory module 205.

For example, the first memory 271 is volatile dynamic random-access memory (DRAM) and the second memory 273 is non-volatile cross-point memory (e.g., 3D XPoint memory). The second memory 273 provides storage function for the first memory 271 that is part of the main memory of the computer system on the memory bus 203. The second memory 273 virtually extends the capacity of the first memory 271 (e.g., DRAM) in the memory module 205 and allows the data in the memory module 205 to be stored even with being powered.

Optionally, the prediction engine 265 is implemented via a field programmable gate array (FPGA), or a application specific integrated circuit (ASIC).

In some instances, when the prediction is made based on page usages, which information is available on the memory module 205, the prediction engine 265 can be implemented on the memory module 205 and/or via the controller 227. Optionally, the prediction engine 265 can be implemented as part of the processing device 118 or a chipset or a separate device coupled to the processing device 118; and the device driver 247, the hypervisor 245, and/or the operating system (e.g., 241 or 243) can provide addition information to improve the prediction capability of the engine 265.

For example, the predictive model 269 can be trained using a supervised machine learning technique.

For example, the predictive model 269 can include an artificial neural network and/or heuristic rules.

In another example, the first memory 271 and the second memory 273 are in separate memory modules (e.g., 205) that are connected to the processing device 118 via a same memory bus 203.

In a further example, the first memory 271 and the second memory 273 are in separate memory sub-systems (e.g., 205 and 209) that are connected to the processing device 118 via separate and different types of communication channels (e.g., 203 and 207).

In some implementations, a communication channel between the processing device 118 and a memory sub-system includes a computer network, such as a local area network, a wireless local area network, a wireless personal area network, a cellular communications network, a broadband high-speed always-connected wireless communication connection (e.g., a current or future generation of mobile network link); and the processing device 118 and the memory sub-system can be configured to communicate with each other using data storage management and usage commands similar to those in NVMe protocol.

A memory sub-system in general can have non-volatile storage media. Examples of non-volatile storage media include memory cells formed in an integrated circuit and magnetic material coated on rigid disks. Non-volatile storage media can maintain the data/information stored therein without consuming power. Memory cells can be implemented using various memory/storage technologies, such as NAND logic gate, NOR logic gate, phase-change memory (PCM), magnetic memory (MRAM), resistive random-access memory, cross point storage and memory devices (e.g., 3D XPoint memory). A cross point memory device uses transistor-less memory elements, each of which has a memory cell and a selector that are stacked together as a column. Memory element columns are connected via two perpendicular lays of wires, where one lay is above the memory element columns and the other lay below the memory element columns. Each memory element can be individually selected at a cross point of one wire on each of the two layers. Cross point memory devices are fast and non-volatile and can be used as a unified memory pool for processing and storage.

The controller (e.g., 228, 227, or 229) of a memory sub-system (e.g., 205 or 209) can run firmware to perform operations responsive to the communications from the processing device 118. Firmware in general is a type of computer program that provides control, monitoring and data manipulation of engineered computing devices.

Some embodiments involving the operation of the controller 228 can be implemented using computer instructions executed by the controller 228, such as the firmware of the controller 228. In some instances, hardware circuits can be used to implement at least some of the functions. The firmware can be initially stored in the non-volatile storage media, or another non-volatile device, and loaded into the volatile DRAM and/or the in-processor cache memory for execution by the controller 228.

A non-transitory computer storage medium can be used to store instructions of the firmware of a memory sub-system (e.g., 209 or 205) and/or the instructions of the operating system (e.g., 241, 243) in general and the device driver 247 and the hypervisor 245 in particular. When the instructions are executed by the controller 228 and/or the processing device 118, the instructions cause the controller 228 and/or the processing device 118 to perform a method discussed above.

Figure 7:
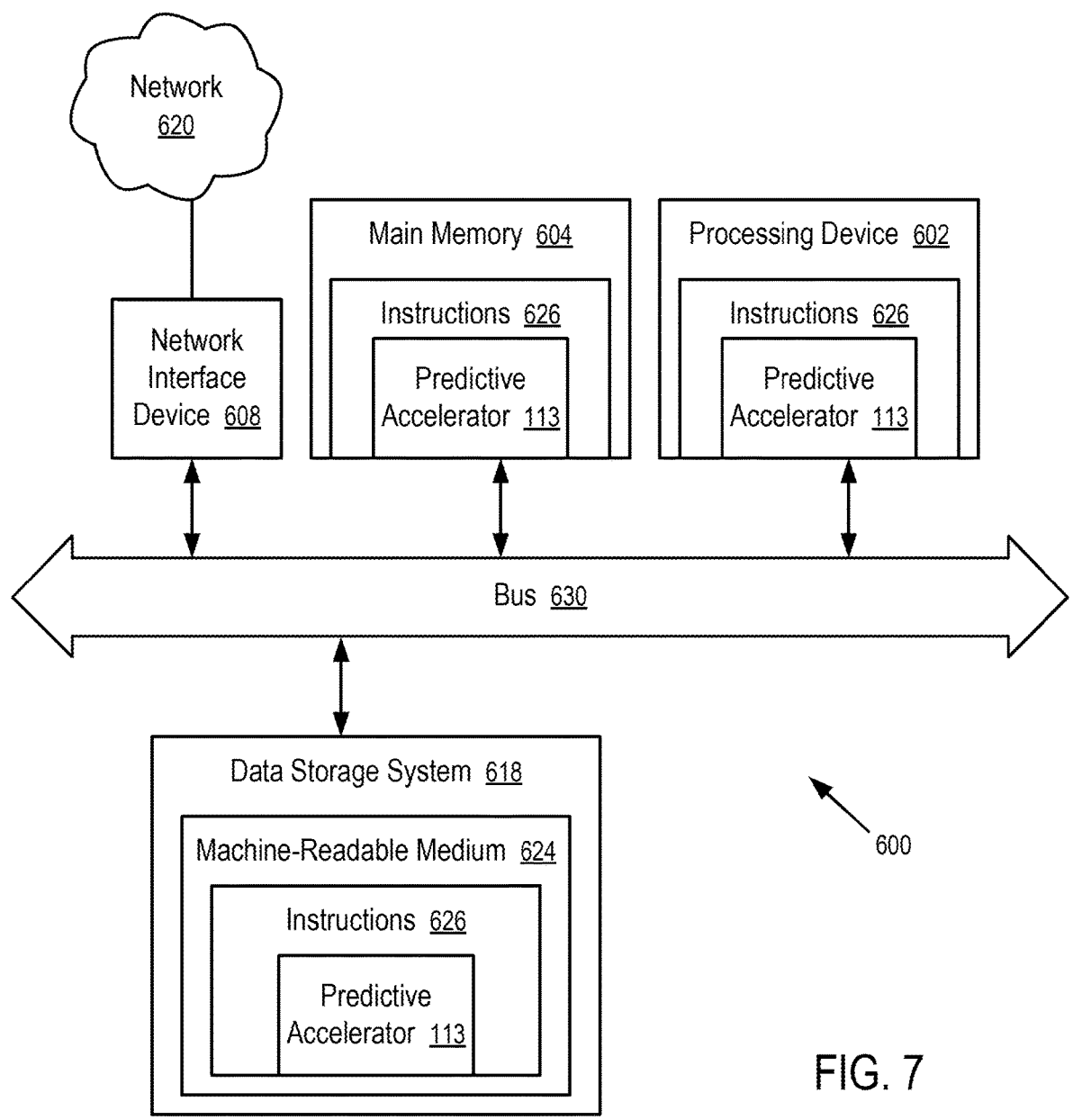
FIG. 7 is a block diagram of an example computer system in which embodiments of the present disclosure can operate.

FIG. 7 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a predictive accelerator 113 (e.g., to execute instructions to perform operations corresponding to the predictive accelerator 113 described with reference to FIGS. 1-6). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), static random access memory (SRAM), etc.), and a data storage system 618, which communicate with each other via a bus 630 (which can include multiple buses).

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to a predictive accelerator 113 (e.g., the predictive accelerator 113 described with reference to FIGS. 1-6). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In this description, various functions and operations are described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A computing system, comprising:
a plurality of memory components having first memory and second memory;
a processing device, operatively coupled with the plurality of memory components, to:
receive, in a prediction engine, an access history of a plurality of pages in the second memory;
receive, in the prediction engine, information associated with the usage of the plurality of pages by a hypervisor, the information associated with the usage comprising attributes of pages accessed in the second memory, wherein the information associated with the usage is determined by the hypervisor based on the usage of the plurality of pages by the hypervisor;
train a prediction model based on the access history and the information associated with the usage;
predict, by the prediction engine using the prediction model, likelihood of the pages being used in a subsequent period of time; and
responsive to the likelihood predicted by the prediction engine, copy by a controller data in a page in the second memory to the first memory.

2. The computing system of claim 1, wherein the information associated with the usage comprises a logical relation between at least two pages.

3. The computing system of claim 1, further comprising a device driver receiving the information associated with the usage of the plurality of pages from the hypervisor and providing the information to the prediction engine; wherein the information comprises at least one of:
instances of requests to load pages from the second memory to the first memory;
content attributes of the pages loaded from the second memory to the first memory;
ownership attributes of the pages loaded from the second memory to the first memory;
identifications of users of the pages loaded from the second memory to the first memory;
identifications applications loaded from the second memory to the first memory;
an identification of pages that are accessed in a sequential mode in a virtual machine;
an identification of pages that are accessed in a sequential mode in a user account; and
an identification of page accesses that are in a steady state.

4. The computing system of claim 3, wherein the device driver controls the controller to copy the data from the second memory to the first memory.

5. The computing system of claim 1, wherein the first memory and the second memory are in a same memory module that is coupled to a central processing unit via a memory bus.

6. The computing system of claim 5, wherein the second memory is not directly addressable on the memory bus by the central processing unit; and the first memory is directly addressable on the memory bus.

7. The computing system of claim 5, wherein the first memory is volatile dynamic random-access memory and the second memory is non-volatile cross-point memory.

8. The computing system of claim 7, wherein the prediction engine is one of:
a field programmable gate array (FPGA); and
application specific integrated circuit (ASIC).

9. The computing system of claim 1, wherein the first memory and the second memory are in separate memory modules that are coupled to a central processing unit via a same memory bus.

10. The computing system of claim 1, wherein the first memory and the second memory are in separate memory systems that are coupled to a central processing unit via separate communication channels.

11. A method, comprising:
training a prediction model of a prediction engine using an access history of a plurality of pages in second memory of a computing system that has first memory and the second memory;
training the prediction model using information associated with the usage of the plurality of pages by a hypervisor, the information associated with the usage comprising meta data of pages accessed in the second memory, wherein the information is generated by the hypervisor based on the usage of the plurality of pages observed in the hypervisor;
predicting, using the prediction model, likelihood of the pages being used in a subsequent period of time following the predicting; and
in response to the likelihood predicted by the prediction engine, copying data in a page in the second memory to the first memory.

12. The method of claim 11, wherein the training is performed using a supervised machine learning technique.

13. The method of claim 12, wherein the predictive model comprises an artificial neural network.

14. The method of claim 12, wherein the access history is for a time period immediately preceding the predicting.

15. The method of claim 11, further comprising:
operating, via a device driver in the computing system, a memory system containing the second memory;
provisioning, by the hypervisor, the second memory as virtual memory in the computing system;
receiving the information associated with the usage of the plurality of pages from the hypervisor; and
applying the information to the prediction model to predict the likelihood.

16. The method of claim 15, further comprising:
receiving page usages in the subsequent period of time; and
further training the prediction model, wherein the further training reduces differences between the received page usages in the subsequent period of time and predicted page usages indicated by the likelihood.

17. The method of claim 16, wherein the memory system is a module that is coupled to a central processing unit via a memory bus; and the first memory and the second memory are in the memory bus.

18. The method of claim 17, wherein the first memory is dynamic random-access memory directly addressable on the memory bus; and the second memory is cross-point non-volatile memory not directly addressable on the memory bus.

19. A non-transitory computer storage medium storing instructions which, when executed by a computing system having first memory, and second memory, and a controller, cause the computing system to perform a method, the method comprising:

training a prediction model of a prediction engine using an access history of a plurality of pages in the second memory of the computing system;

training the prediction model using information associated with the usage of the plurality of pages by a hypervisor, the information associated with the usage comprising information indicating a type of data contained in the plurality of pages, the information being determined by the hypervisor;

predicting, using the prediction model, likelihood of a page in the second memory being used in a subsequent period of time following the predicting; and in response to the likelihood being above a threshold, copying data in the page in the second memory to the first memory.

20. The non-transitory computer storage medium of claim 19, wherein the method further comprises:

receiving page usages in the subsequent period of time;

further training the prediction model to reduce differences between the received page usages in the subsequent period of time and predicted page usages indicated by the likelihood;

predicting, using the prediction model after the further training, likelihood of a further page in the second memory being used in a further subsequent period of time; and in response to the likelihood of the further page predicted by the prediction engine being below a separate threshold, copying data to the further page in the second memory from the first memory.

* * * * *